A. K. SEARS.
MULTIPLE STAFF HOLDER.
APPLICATION FILED MAY 5, 1917.

1,264,446.

Patented Apr. 30, 1918.

Witness
C. C. Holly.

Inventor
Archie K. Sears
by James R. Townsend
his atty.

UNITED STATES PATENT OFFICE.

ARCHIE K. SEARS, OF EAGLE ROCK, CALIFORNIA.

MULTIPLE STAFF-HOLDER.

1,264,446.　　　　Specification of Letters Patent.　　Patented Apr. 30, 1918.

Application filed May 5, 1917. Serial No. 167,094.

*To all whom it may concern:*

Be it known that I, ARCHIE K. SEARS, a citizen of the United States, residing at Eagle Rock, in the county of Los Angeles and State of California, have invented a new and useful Multiple Staff-Holder, of which the following is a specification.

An object of this invention is to provide an appliance of simple and cheap construction which is adapted to hold flag staffs, number plates on automobiles, and the like, and which can quickly and easily be applied in a most firm and substantial manner to the radiator neck of any automobile, and can as quickly and easily be detached when desired.

While the invention is primarily intended for holding flags, pennants and license number plates, on automobiles, it is understood that it may be used for any purpose and in any place where such a holder might be desired.

The invention includes an attachment comprising a pair of jaws adjustably held together by a bolt and connected at one end to an adjustable band to encircle the radiator neck or other support, and adapted at the other end for gripping a stem, staff or plate, and detachable socket pieces connected to the jaws and adapted to hold additional staffs.

An object of the invention is to provide a holder of great strength and rigidity having parts of ready and cheap construction that are adapted to hold at the front of an automobile radiator, three flags or two flags in attractive or ornamental arrangement, or one flag in a desired position in addition to or without, holding a name plate.

In this invention I provide two duplicate members having like opposite edges and having vertical jaws at one end, eyes and lateral outwardly bent lugs at the other end, a bolt hole adjacent the eyes, and corresponding depressed seats at the top and bottom edges between the jaws and bolt holes to rigidly seat a transverse duplex socket; and I mount in the upper seats a horizontal intermediate limb of a duplex socket base member having a horizontal base limb provided with a central bolt hole and with grooved wings extending divergently upward from the horizontal limb, and mount thereon an upper socket member comprising a horizontal limb having a central bolt hole, and grooved divergent wings complementary to the grooved wings of the base member; and I insert bolts into the bolt holes, and supply the same with nuts, and apply outside the lugs and insert through the eyes, the ends of a suitable metal band forming a loop, the ends of which are adapted to be bent back and applied inside of and against and extended beyond the ends of the lateral lugs and thence against the inside of the loop to frictionally engage the radiator neck upon which the holder is to be mounted, and also to allow the loops to engage the terminals of the band to frictionally hold them against the neck.

By such construction I provide a multiple holder that is ready for instant application.

Other objects, advantages and features of invention may appear from the accompanying drawings, the subjoined detail description and the appended claims.

The accompanying drawings illustrate the invention.

Figure 1:
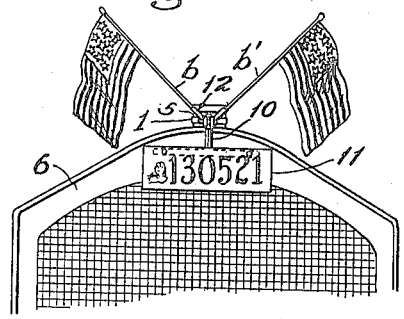
Figure 1 is a view on a small scale of my invention as applied to the neck of the radiator of an automobile, a portion of which is shown.
Figure 4:
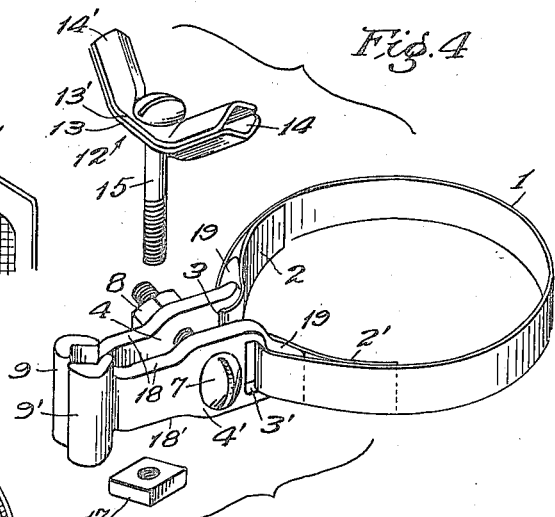
Fig. 4 is a perspective view of the device removed from the automobile, showing the duplex socket and its bolt and nut detached.
Figure 2:
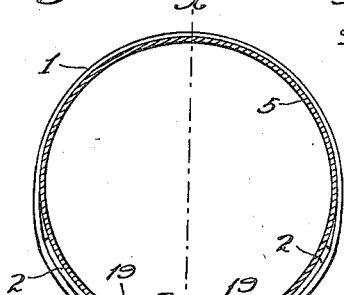
Fig. 2 is a plan view of the holder in place on a radiator neck which is shown in section. The stem of a number plate holder is also shown in section.

A narrow strap 1 of sheet metal of somewhat more than sufficient length to encircle the neck of an automobile has its ends 2, 2', inserted through the eyes 3 and 3' respectively, in one end of a pair of jaw members 4, 4', said ends 2, 2' being bent back around the rear rims of the eyes and lapped onto the main body of the strap, where they are held in place by the pressure of such main body, clamping the lapped ends against the neck 5 of the radiator 6 when said members 4, 4' are clamped together by bolt and nut 7, 8.

The outer ends of jaw members 4, 4' are formed into vertical jaws 9, 9', angular in cross section with a view to more surely clamp a flag staff or a stem 10 of a number plate 11.

The duplex socket 12 is formed of nested socket pieces constructed of two strips of sheet metal having straight central bodies 13, 13', and are bent at the ends to form oblique channel arms forming the angular sockets 14, 14'. The strips 13, 13' are clamped together and onto the upper edges of the jaw member by a bolt 15 which is vertically inserted through central holes 16 in the bodies 12 and down through the space between the jaw members 4, 4' and secured by nut 17 engaging the under edges of the jaw members; corresponding seats 18, 18' being provided in the jaw members 4, 4' to accommodate the socket member 12 and nut 17. The sockets 14, 14' are bent at an angle to the vertical bolt 15 of approximately 45° and are designed to hold flag staffs $b$, $b'$. The body 13' of the upper socket member is slightly shorter than the lower body 13, so that the upper socket member may be nested with the lower socket member.

Figure 5:
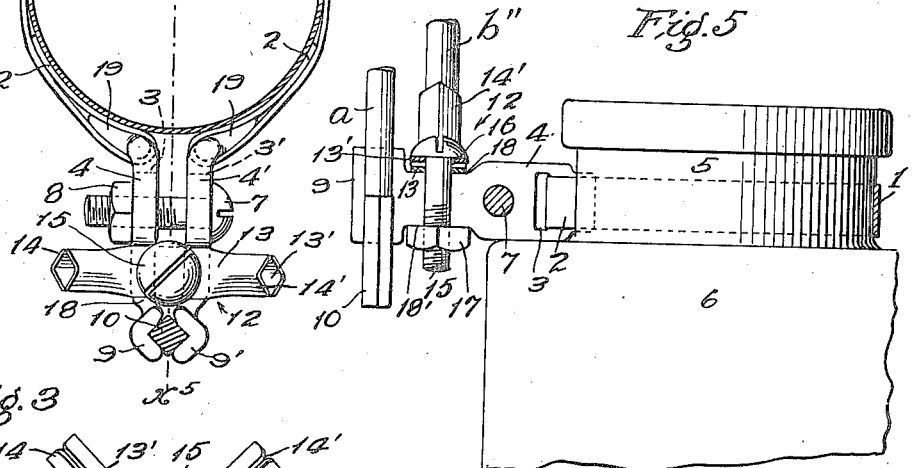
Fig. 5 is an elevation partly in section on line $x^5$, Fig. 2, showing the invention attached to the neck of a radiator, a fragment of which is shown in unsectioned elevation.
Figure 3:
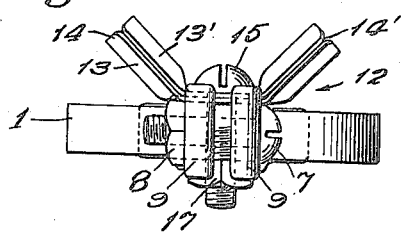
Fig. 3 is an enlarged detached front view of the attachment shown in Fig. 1.

The jaws 9, 9' may be used to clamp another flag staff $a$, a fragment of which is shown in Fig. 5, or may be used for any other object which may be caught thereby and which one may wish to attach to the front of the automobile. The duplex socket piece 12 with bolt 15 and nut 17 may be detached and laid aside when it is desired to omit it.

The jaw members 4, 4' are preferably made of cast iron, brass or other metal and also may be stamped from sheet metal and pressed into shape.

The device if made of brass or other metal may be nickel-plated, painted or enameled to match the automobile to which it is to be attached.

The jaw members 4, 4' are duplicates of each other and are formed as a single stamping, all that is necessary in assembling the same being to reversely turn the members of each pair edge for edge, the eyes being at one end of the jaw member and the jaws at the other end.

The laterally extending lugs 19 are at an angle to accommodate the angle of the band 1 when it is applied to the neck 5 or other object to which the clip is attached. When the device is in place and the bolt 7 is tightened to close the jaws upon a stem 10 or staff $a$, or both, the end rims of the eyes, together with the lugs draw the band tight, exerting a leverage upon the bands to draw the band against the inturned band ends 2, 2', to prevent such portions from slipping outwardly through the eyes.

The appliance is prepared for the market by selecting the necessary parts going to make up a holder; which may be assembled in part or in whole as suggested by the drawings.

The strap, however, will usually not be bent into form until the appliance is to be put on the radiator. Then with bolt 7 removed and the jaw members disassembled the band will be bent into the eyes and around the support 5 and the jaw members will then be brought into position to allow the bolt 7 to be inserted and the nut applied thereon.

The flag staff $a$ and number plate 10 may then be inserted into place in the jaw and the nut tightened. The duplex socket members will then be nested together and the vertical bolt 15 will then be inserted through said nested members and down between the jaw members, the body 13 will be brought into transverse position as shown and the nut 17 will be applied in seat 18' and the bolt 15 turned to tighten the duplex socket and hold it in place.

To apply the flag staffs $b$, $b'$ the bolt will be loosened, the flag staffs inserted into the sockets, and the bolt will then again be tightened to draw the upper body and its channeled ends toward the lower body and its channeled ends thus clamping the flag staffs $b$, $b'$ and fastening the same to the jaw members.

I claim:

1. A multiple staff holder comprising duplicate jaw members having jaws at one end, eyes and lug extensions at the other end, bolt holes adjacent the eyes, and seats between the bolt holes and the jaws; a band having its ends bent through the eyes and lapped inside and upon the band body to encircle and engage a support; a bolt extending through the holes; a nut for the bolt; nested socket pieces assembled together and each comprising a central limb above the upper seats of the jaw members, and reversely slanting complementary channel arms extending upward from the central limbs to form sockets, there being vertical bolt holes through the central limbs; a vertical bolt inserted through said vertical bolt holes, and a nut screwed onto the vertical bolt and seated in the lower seats.

2. A staff holder comprising duplicate jaw members having jaws at one end and eyes and lateral lugs at the other end and bolt holes between; a strap bent through the eyes to encircle a support; a bolt extending through the holes and a nut to tighten the bolt.

3. The staff holder reversible jaw member set forth provided at one end with a jaw, at the other end with an eye, and between said ends with a bolt hole, the edges of said members being alike so that two of such members may be assembled together to form a clip adapted to receive a bolt and a strap for the purpose of drawing the strap tight about a support when a nut on the bolt is tightened and an object is between the jaws.

4. In a staff holder, duplicate jaw members provided at one end with jaws and at the other end with eyes and between said ends with bolt holes, a bolt through said holes, a strap bent into the eyes and adapted to encircle a support, and a nut on the bolt.

5. The staff holder set forth comprising jaw members having jaws at one end, eyes and laterally extending lugs at the other end and a bolt hole between the jaws and eyes, a bolt through the bolt holes, a nut on the bolt and a strap bent through the eyes and around the lugs to encircle a support.

6. The staff holder set forth comprising jaw members having jaws at one end, eyes and laterally extending lugs at the other end and bolt holes between the jaws and eyes; a bolt through the bolt holes; a nut on the bolt; a strap bent through the eyes to encircle a support, there being a space between the bolt holes and the jaws to receive a vertical bolt, and a seat to accommodate a socket member; a nut; a socket member seated in said seat, and a vertical bolt inserted through said socket member and between the jaw members and tightened by the nut on the underside of said jaw members.

7. The duplex socket set forth constructed of two strips each bent to form a central body and oblique channel ends; a vertical bolt through the bodies; members having a vertical space to receive the bolt and a seat to receive the lower body; said bolt being inserted through said space and a nut on the underside of said members to engage the members and to tighten the bolt.

In testimony whereof, I have hereunto set my hand at Los Angeles, California, this 25th day of April 1917.

ARCHIE K. SEARS.

Witness:
JAMES R. TOWNSEND.